United States Patent [19]
Ackroyd

[11] Patent Number: 5,236,009
[45] Date of Patent: * Aug. 17, 1993

[54] DOUBLE CHECK BACKFLOW PREVENTER WITH IMPROVED TOGGLE LINKAGE CHECK VALVE

[75] Inventor: Rand H. Ackroyd, Methuen, Mass.

[73] Assignee: Watts Investment Company, Wilmington, Del.

[*] Notice: The portion of the term of this patent subsequent to Dec. 17, 2008 has been disclaimed.

[21] Appl. No.: 821,623

[22] Filed: Jan. 16, 1992

Related U.S. Application Data

[63] Continuation-in-part of Ser. No. 806,601, Dec. 12, 1991, Pat. No. 5,176,172, which is a continuation of Ser. No. 644,434, Jan. 22, 1991, Pat. No. 5,072,753.

[51] Int. Cl.$^5$ .............................................. F16K 15/03
[52] U.S. Cl. ..................... 137/527; 137/512; 137/454.2; 251/337
[58] Field of Search ............. 137/527, 527.2, 527.4, 137/527.6, 512, 454.2, 454.6; 251/298, 303, 337

[56] References Cited

U.S. PATENT DOCUMENTS

| | | | |
|---|---|---|---|
| 1,399,791 | 12/1921 | Pierson | 137/535 |
| 1,871,536 | 8/1932 | Le Bus | |
| 2,515,425 | 7/1950 | Restemeier | 183/39 |
| 2,556,277 | 6/1951 | Hill et al. | 244/57 |
| 2,626,124 | 1/1953 | McCarthy | 251/134 |
| 2,748,788 | 6/1956 | Duckstein | 137/53 |
| 3,026,902 | 3/1962 | Ruhl, Jr. | 137/484.2 |
| 3,276,465 | 10/1966 | Wyckoff | 137/107 |
| 3,313,458 | 4/1967 | Braun | 222/402.13 |
| 3,478,778 | 11/1969 | Curtiss et al. | 137/527.4 |
| 3,482,603 | 12/1969 | Outcalt | 137/515.5 |
| 3,604,453 | 9/1971 | Boltnott | 137/527 |
| 3,789,874 | 2/1974 | Hills | 137/527 |
| 3,817,273 | 6/1974 | Erwin, Jr. | 137/338 |
| 3,857,408 | 12/1974 | Rhodes et al. | 137/514 |
| 3,974,848 | 8/1976 | Wheatley | 137/102 |
| 3,996,962 | 12/1976 | Sutherland | 137/527.4 |
| 4,019,532 | 4/1977 | Schittek | 137/527 |
| 4,067,356 | 1/1978 | Kreuz | 137/527 |
| 4,569,248 | 6/1986 | Lieberman | 128/207.16 |
| 4,569,636 | 2/1986 | Bauer et al. | 417/295 |
| 4,989,635 | 2/1991 | Dunmire | 137/527 |
| 5,046,525 | 9/1991 | Powell | 137/512 |
| 5,072,753 | 12/1991 | Ackroyd | 137/527 |

OTHER PUBLICATIONS

"Check Valves", Ames (brochure).
"Dual Function Swing Check Valves", Merit Manufacturing Corporation (brochure).
Catalog C-91, Watts Regulator Company.

*Primary Examiner*—John Rivell
*Attorney, Agent, or Firm*—Fish & Richardson

[57] ABSTRACT

A toggle linkage check valve includes a housing having an inlet and an outlet, and a valve assembly disposed within the housing. The valve assembly includes (i) a sealing plug adapted for movement between a first, closed position for preventing flow of liquid between the inlet and the outlet, and a second, open position for substantially permitting flow of liquid between the inlet and the outlet, and (ii) a spring assembly removably disposed within the valve assembly. The spring assembly contacts the sealing plug and biases the sealing plug towards the first, closed position. The spring assembly comprises a rod member and means for biasing the rod member toward the sealing plug. In the second, open position of the sealing plug, the rod member lies at an acute angle to a plane of the sealing plug.

20 Claims, 8 Drawing Sheets

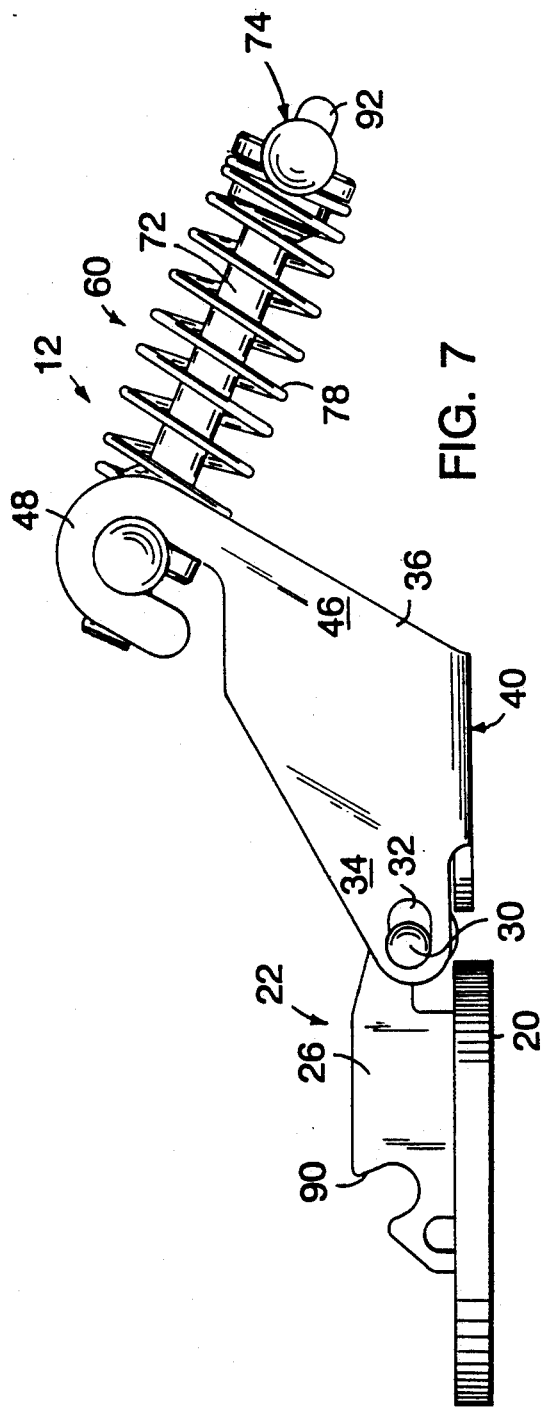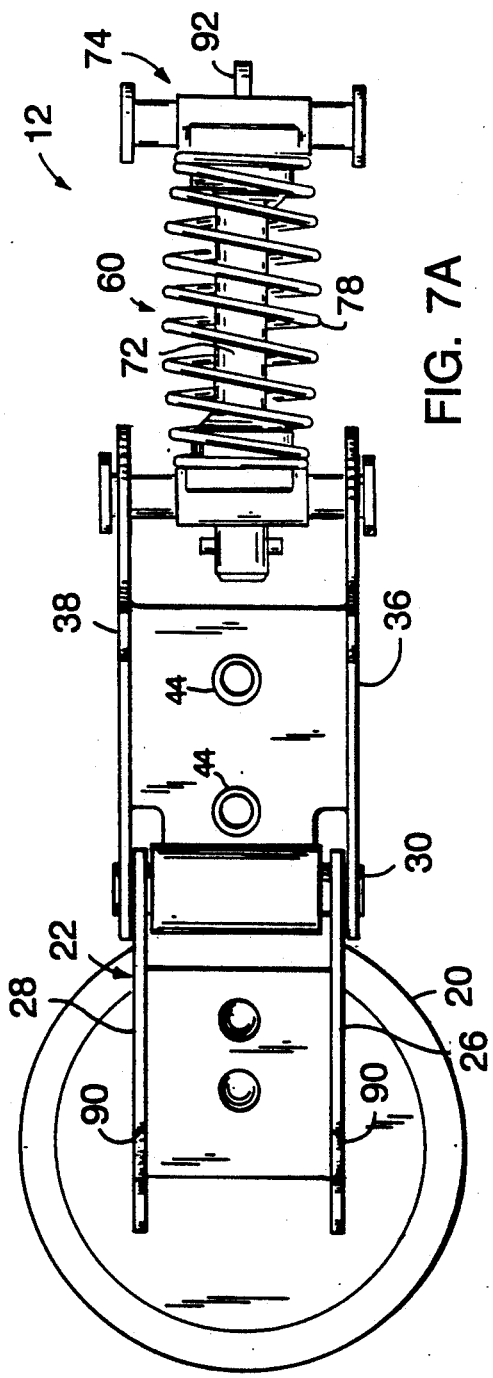

DOUBLE CHECK BACKFLOW PREVENTER WITH IMPROVED TOGGLE LINKAGE CHECK VALVE

CROSS REFERENCE TO RELATED APPLICATIONS

This is a continuation-in-part of application Ser. No. 07/806,601, filed Dec. 12, 1991, now U.S. Pat. No. 5,176,172, which is a continuation of application Ser. No. 644,434, filed Jan. 22, 1991, issued as U.S. Pat. No. 5,072,753 on Dec. 17, 1991.

BACKGROUND OF THE INVENTION

The invention relates to check valves and more particularly to valves for preventing back flow.

Check valves are provided in a conduit system to prevent the backwards flow of liquid, e.g. in the event of a reduction or reversal of a supply pressure In a typical water piping system in a home or other building, check valves are used to prevent back flow of potentially contaminated water from the building water system (e.g. water from a wash tub containing detergent or other cleaning agents, or water from a lawn or garden hose contaminated with fertilizer or other chemicals) into the water main, as may occur, e.g., due to a sudden loss of pressure in the water main. Different valve systems have been designed for the purpose of assuring that a drop in supply pressure will result in the closing of the check valve in order to prevent back flow.

In one prior art back flow valve, the sealing plug is weighted to bias the valve toward the closed position. Forward flow of a liquid under normal pressure forces the valve into open position, but upon pressure reduction, the weight aids in closing the valve. A weight biased valve typically does not close quickly enough to avoid flow reversal which slams the valve shut and creating a noisy, hammering sound.

Referring to FIG. 1, another prior art check valve 1 has a sealing plug 2 mounted upon a scissor assembly 4. Springs 6 are attached at both sides of the scissor assembly 4 between the scissor hinge arms 8, 8' which are generally perpendicular to the plane P of the sealing plug 2 in closed position. The springs are disposed generally at a 45 degree angle to the flow of liquid, the bias of springs 6 serving to urge the scissor assembly 4 toward a compressed configuration, thereby forcing the sealing plug 2 against the inlet 9 to positively close the valve. The forward flow of liquid (arrow F) under normal pressure opens the valve.

SUMMARY OF THE INVENTION

In one aspect, the invention relates to a toggle linkage check valve including a housing having an inlet and an outlet, and a valve assembly disposed within the housing. The valve assembly includes a sealing plug adapted for movement between a first, closed position for preventing flow of liquid between the inlet and the outlet, and a second, open position for substantially permitting flow of liquid between the inlet and the outlet, and it includes a spring assembly removably disposed within the valve assembly. The spring assembly contacts the sealing plug and biases the sealing plug towards the first, closed position. The spring assembly comprises a rod member and means for biasing the rod member toward the sealing plug. In the second, open position of the sealing plug, the rod member lies at an acute angle to a plane of the sealing plug.

Preferred embodiments have the following features. The rod member lies at an acute angle with respect to the perpendicular to a plane of the sealing plug when the sealing plug is in the first, closed position. The acute angle with respect to the perpendicular to the plane of the sealing plug is approximately 15". The spring assembly is a telescoping spring assembly and the means for biasing is a coil spring The valve assembly also includes a valve seat, which the sealing plug contacts the valve seat when the sealing plug is in the first, closed position. Also, the valve assembly is a modular unit which includes the sealing plug, the spring assembly, and the valve seat.

In another aspect, the invention relates to a backflow preventer comprising a housing having an inlet and an outlet, a first valve assembly disposed within the housing, and a second valve assembly disposed between the first valve assembly and the outlet. The first valve assembly includes a first sealing plug adapted for movement between a first, closed position for preventing flow of liquid between the inlet and the outlet, and a second, open position for substantially permitting flow of liquid between the inlet and the outlet, and it includes a first spring assembly removably disposed within the first valve assembly. The first spring assembly contacts the first sealing plug and biases the first sealing plug towards the first, closed position. The first spring assembly comprises a first rod member and first means for biasing the first rod member toward the first sealing plug. The second valve assembly includes a second sealing plug adapted for movement between a first, closed position for preventing flow of liquid between the inlet and the outlet, and a second, open position for substantially permitting flow of liquid between the inlet and the outlet, and it includes a second spring assembly removably disposed within the second valve assembly. The second spring assembly contacts the second sealing plug and biases the second sealing plug towards the first, closed position. The second spring assembly comprises a second rod member and second means for biasing the second rod member toward the second sealing plug. In the second, open position of the first sealing plug, the first rod member lies at a first acute angle to a plane of the first sealing plug. In the second, open position of the second sealing plug, the second rod member lies at a second acute angle to a plane of the second sealing plug.

One advantage of the improved toggle link check valve is its ability to handle a greater flow rate than previous designs of the same size. Mounting the telescoping spring assembly in the toggle linkage check valve assembly such that it lies at an acute angle to a perpendicular to the plane of the sealing plug enables the sealing plug to open farther than in prior designs. This means that for the same orifice size, substantially greater flow volume can be achieved for a given pressure drop across the valve. For any given valve size, this enables one to use a smaller valve housing and still meet the flow requirements for that size. The reduced size greatly reduces the weight of the valve because considerably less iron is required in the housing. For example, a backflow preventer valve assembly which meets the requirements set out for a 6" valve can be achieved with a unit that weighs only 250 pounds. (Note with a unit that weighs only 250 pounds. (Note that a complete full backflow preventer also includes two gate valves, one attached at either end of the double check valve assembly.) Previous designs produced valves that weighed about 700 pounds, almost three times as much.

In addition, the modular design of the toggle link check valve, the orientation of the spring assembly and the telescoping design of the spring assembly enable one to build a valve assembly having a substantially lower profile than previously achievable. This, in turn, leads to being able to build a backflow preventer which is considerably shorter. Using the above example relating to a backflow preventer that meets the requirements of a 6" valve assembly, the invention yields a design having an overall length of about 34" as compared to a length of about 62" for previous designs.

Another advantage is that the invention greatly reduces the time required to repair or maintain the overall valve. Because the improved toggle link is of modular design and can be removed as a single unit, repair or maintenance simply involves replacing the toggle link valve. One need not spend time rebuilding the valve on location, a process which can be very time consuming and demanding. This can reduce repair and maintenance jobs from a all day job to a process that takes less than an hour to complete Still another advantage is that the access cover is a flat plate which can be stamped, and therefore it is inexpensive to either manufacture or buy.

Other advantages and features will become apparent from the following description of preferred embodiments and from the claims.

DESCRIPTION

We first briefly describe the drawings.

Figure 1:
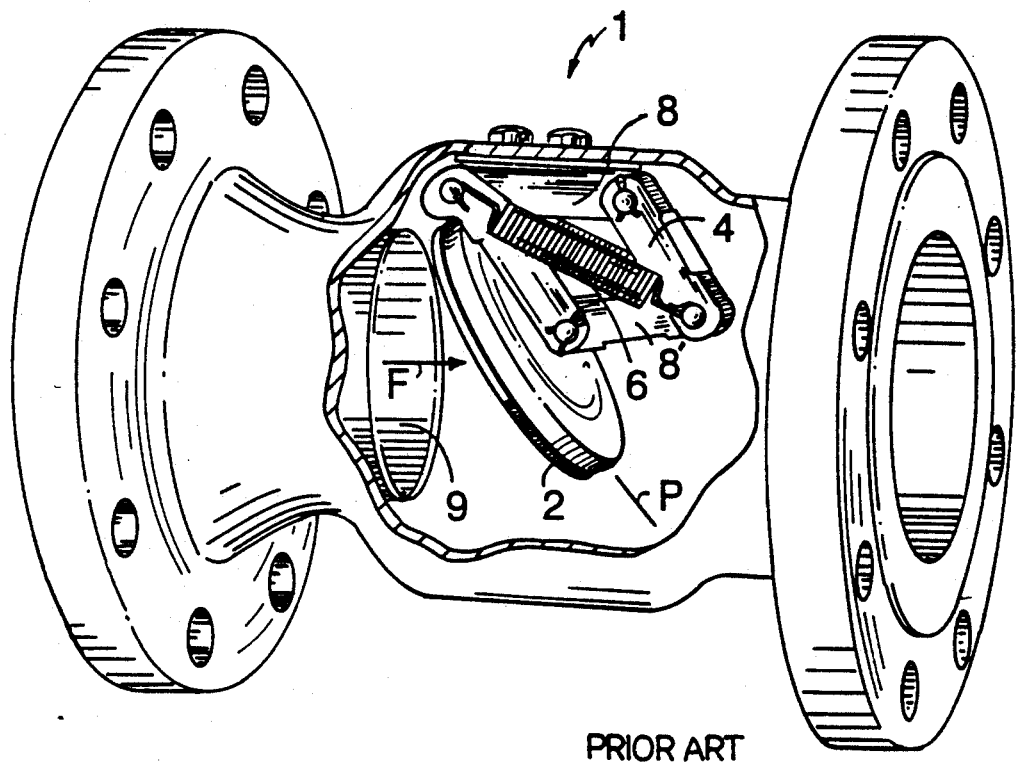
FIG. 1 is a somewhat diagrammatic side section view of a prior art check valve.
Figure 2:
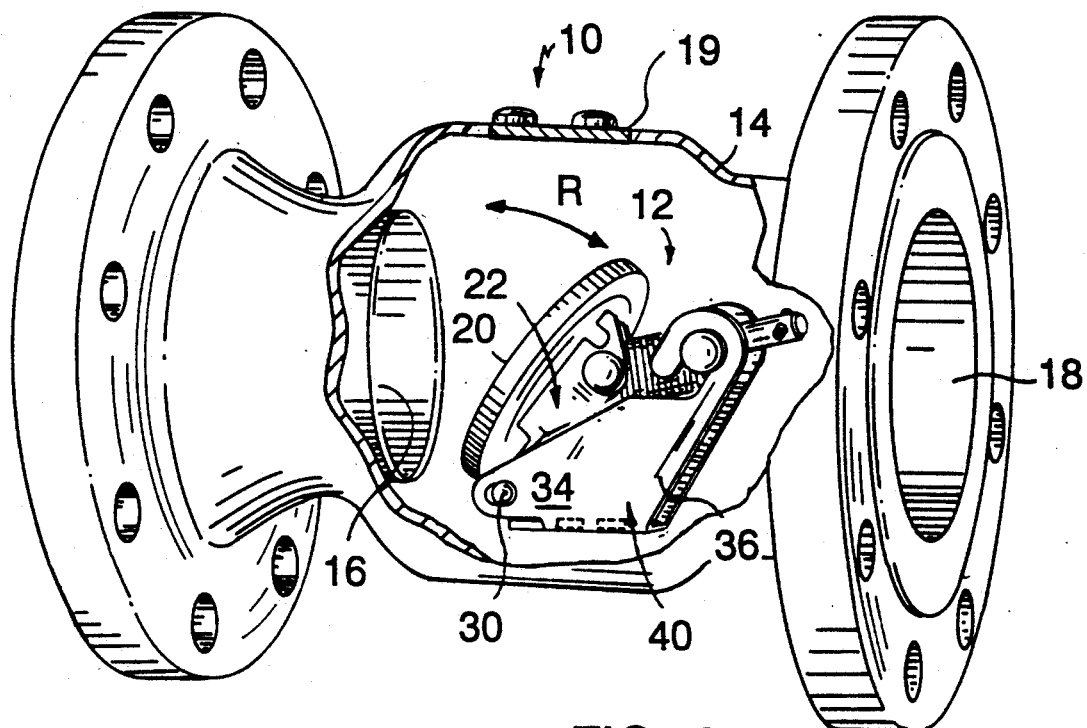
FIG. 2 is a similar view of a toggle linkage check valve of the invention.
Figure 6:
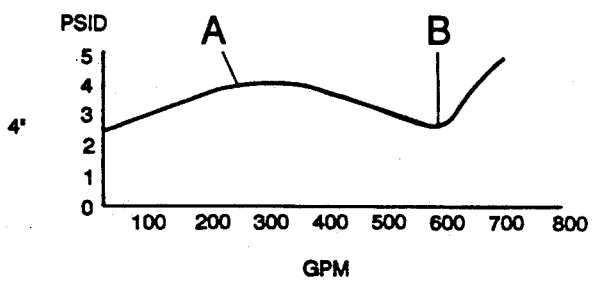
Figure 6A:
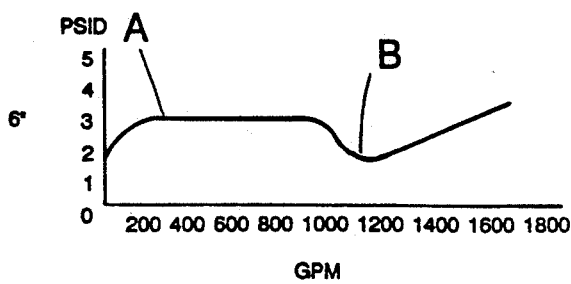
Figure 6B:
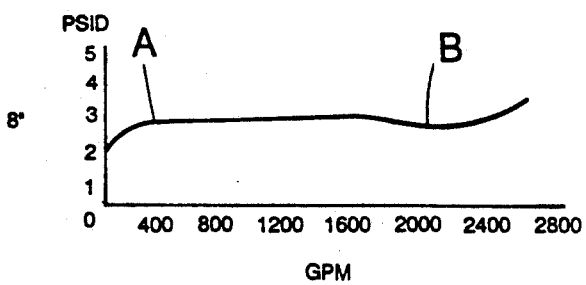
Figure 8:
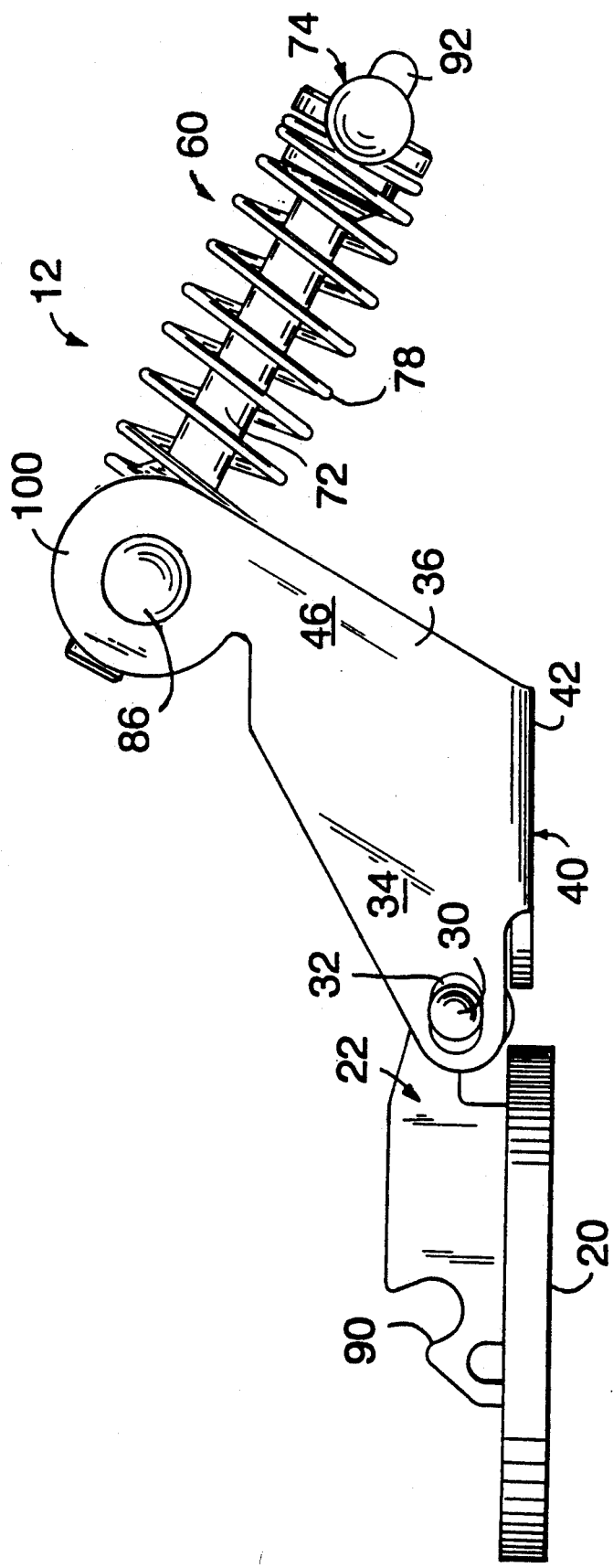
Figure 9:
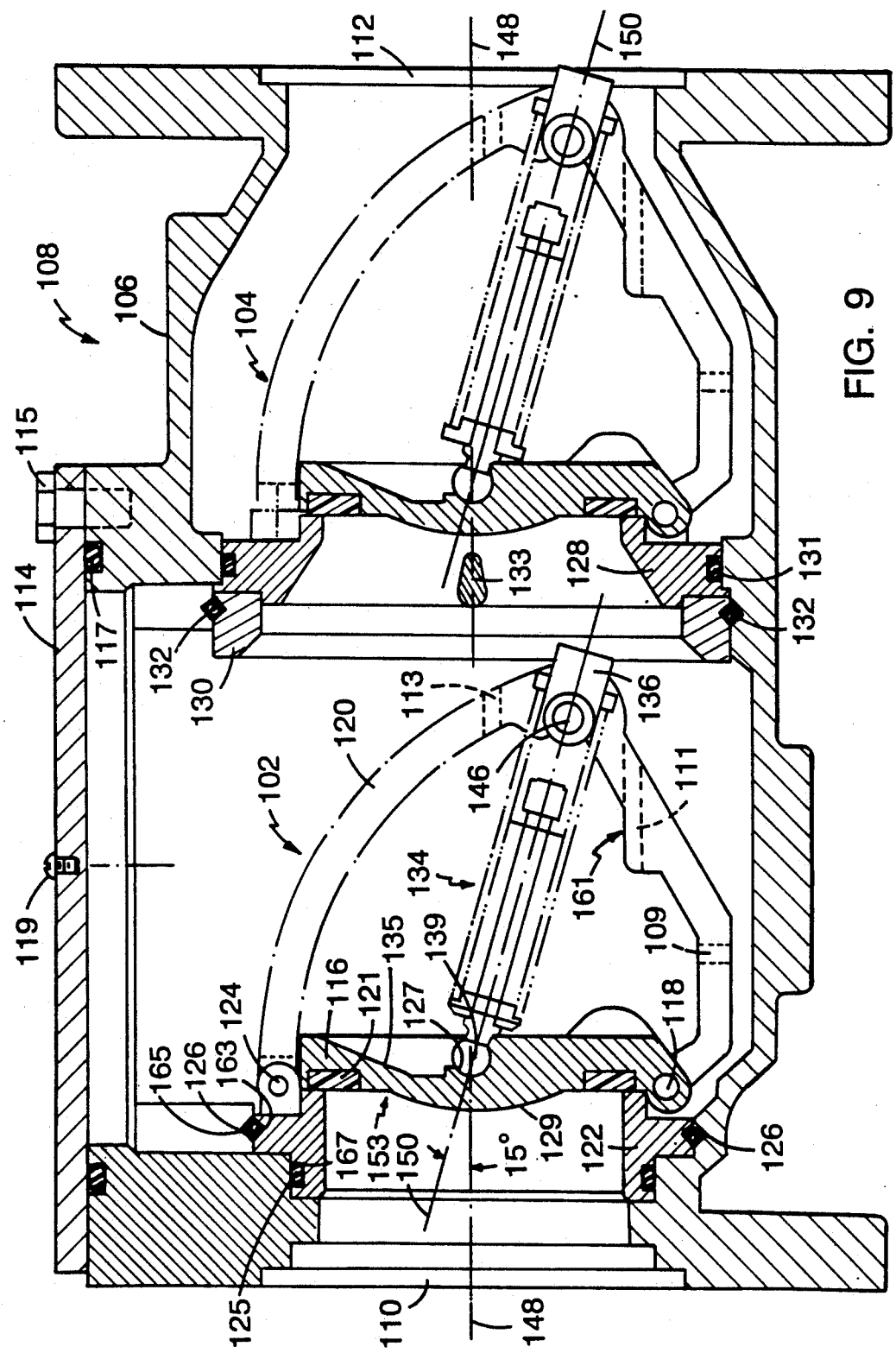
Figure 10:
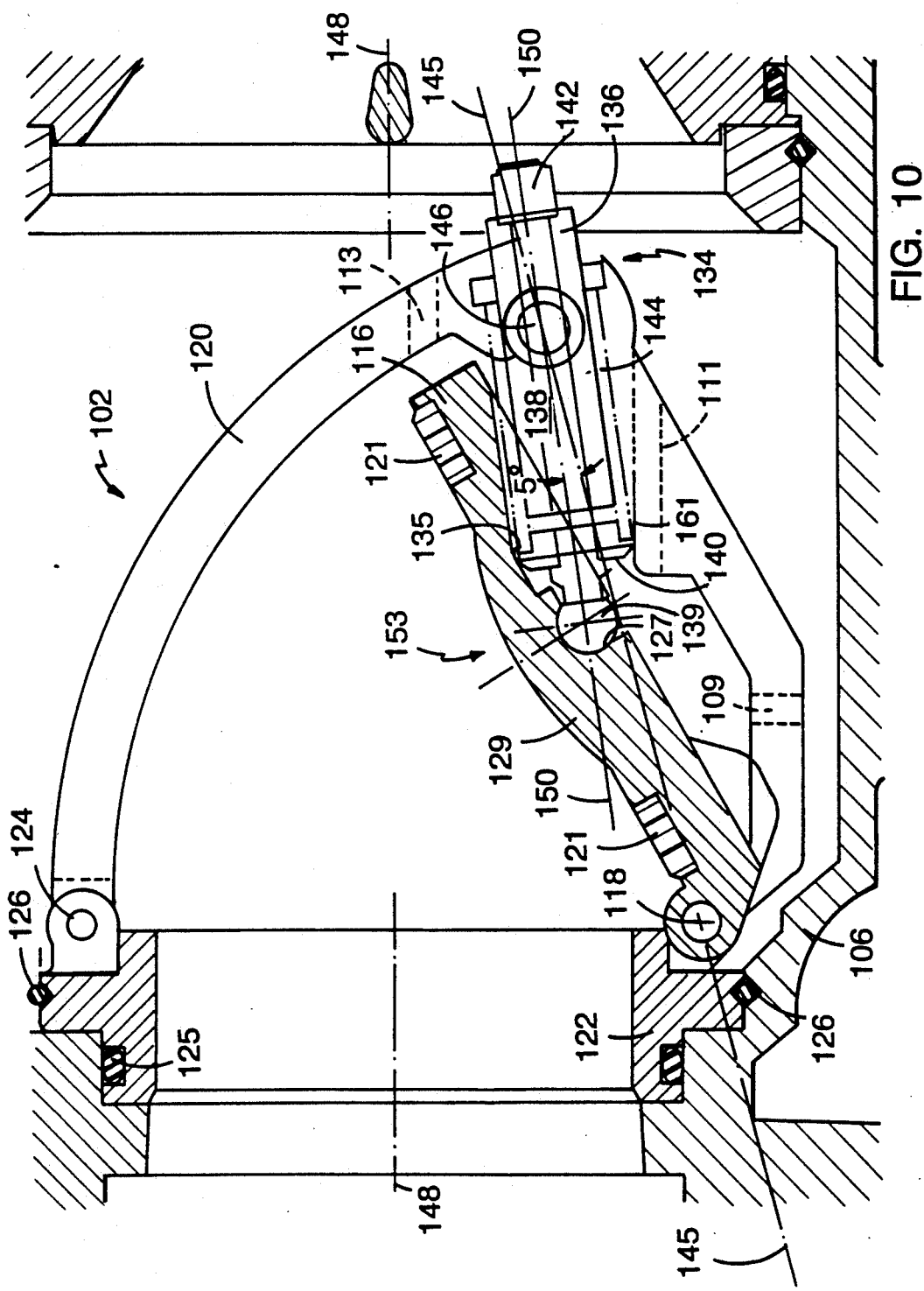
Figure 11:
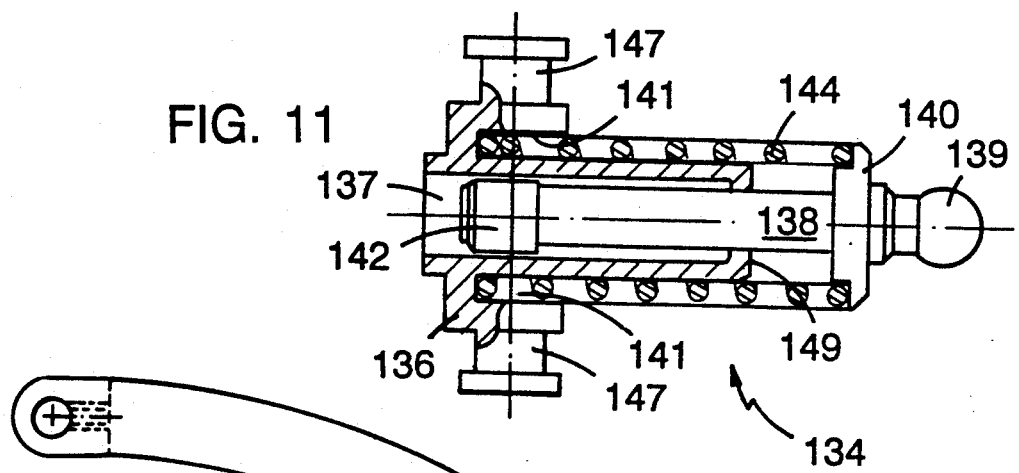
Figure 12:
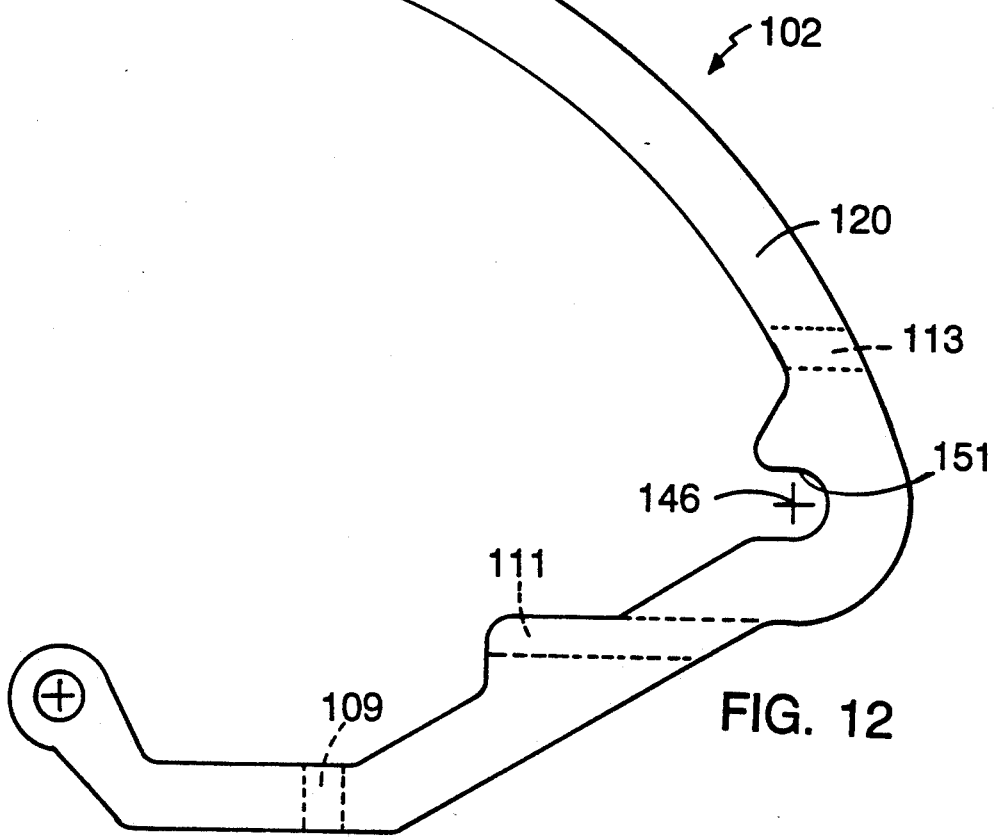
Figure 13:
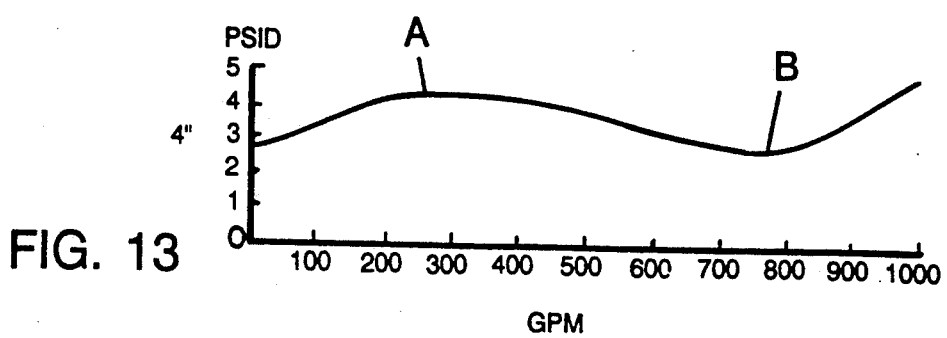

FIGS. 6, 6A, and 6B are plots of pressure versus liquid flow for a toggle linkage check valve of the invention, FIG. 6 relating to operation of a 4 inch radius sealing plug, FIG. 6A relating to operation of a 6 inch radius sealing plug and FIG. 6B relating to operation of an 8 inch radius sealing plug;

FIG. 7 is a side view of the toggle linkage check valve of FIG. 2 in front uncoupled position; FIG. 7a is a top view of the bracket of the check valve with the spring assembly in the uncoupled as in FIG. 7;

FIG. 8 is a similar view of another embodiment of the toggle linkage check valve of the invention in front uncoupled position, with the rear toggle fixably and rotatably attached to the curved spring assembly retaining portion;

FIG. 9 is cross-sectional side view of a backflow preventer including two modified toggle linkage check valve assemblies in a closed position;

FIG. 10 is a cross-sectional side view of the modified toggle linkage check assembly in a fully open position;

FIG. 11 is a partial cross-sectional top view of a spring assembly of the modified check valve assembly;

FIG. 12 is side view of one of two essentially identical rails that together form a check valve cage of the modified check valve assembly; and FIG. 13 is a plot of pressure versus flow for the backflow preventer of FIG. 9, where the opening to each modified check valve assembly in the backflow preventer is approximately 4.00 inches in diameter.

Referring to FIG. 2, a toggle linkage check valve 10 of the invention consists of a check valve assembly 12 mounted within a housing 14. The housing 14 defines an inlet 16 and an outlet 18, and the check valve assembly 12 is positioned adjacent the inlet 16. The housing 14 also includes an access cover 19 which permits access to the check valve assembly 12. The check valve assembly is mounted in a manner such that flow of liquid is substantially unimpeded in the direction from inlet 16 toward outlet 18, but prevented from flowing in the reverse direction from outlet 18 toward inlet 16.

Figure 3:
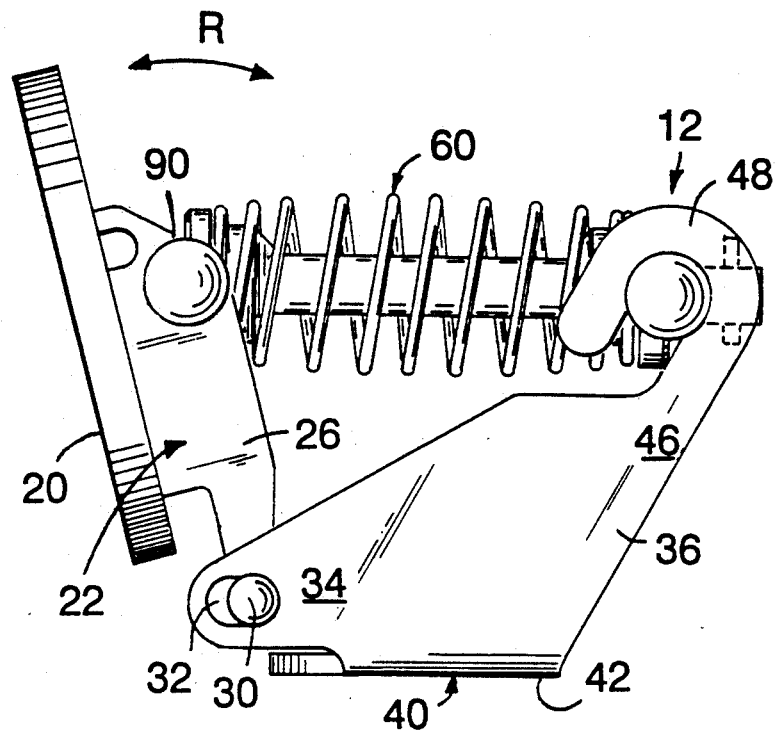
FIG. 3 is a side view of the check valve element of the embodiment of FIG. 2 in closed position.
Figure 4:
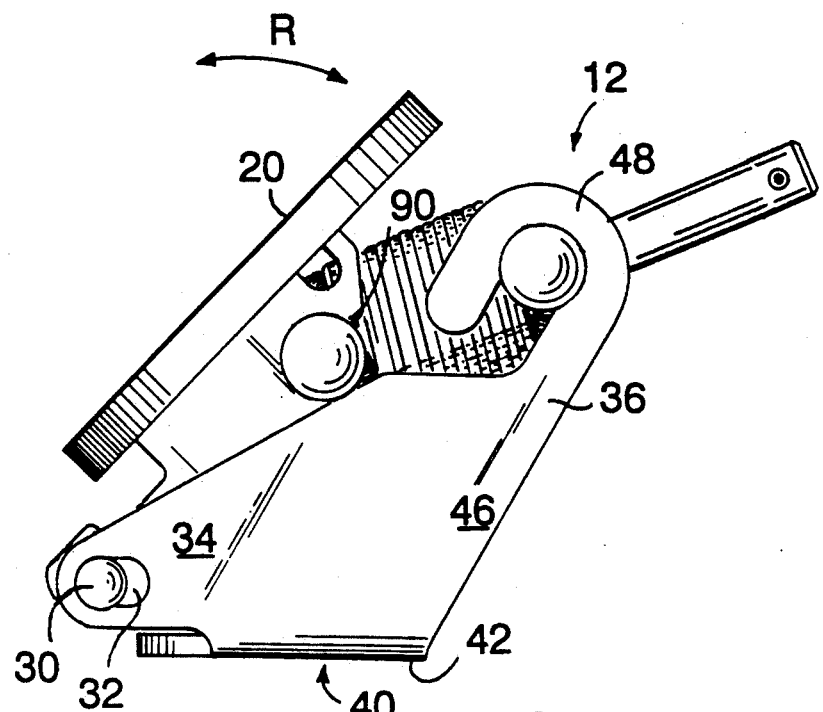
FIG. 4 is a similar view of the check valve element of FIG. 3 in open position.

Referring now also to FIGS. 3 and 4, the check valve assembly 12 consists of a sealing plug 20 mounted at the inlet end of an arm 22. The arm 22 is rotatably mounted at the inlet end 34 of a mounting bracket 40. The rotatable attachment is obtained by alignment of slots in both sides of the outlet end of arm 22, with slots 32 in both sides 36, 38 of the inlet end 34 of the mounting bracket 40. The outlet end of arm 22 rides upon a roller bearing 30 located between the sides 36, 38 of the mounting bracket 40, the ends of the roller bearing 30 resting within the slots of the mounting bracket. The combination of arm 22 and roller bearing 30 permits the sealing plug 20 of the check valve assembly 12 to rotate (arrow R) between a first, closed position (FIG. 3) and a second, open position (FIG. 4). In closed position, the sealing plug 20 is engaged against the inlet 16 to prevent flow of liquid through the valve 10. In open position, the sealing plug 20 is displaced from the inlet 16 to permit flow of liquid.

The mounting bracket 40 has a base portion 42 through which are formed two tapped mounting holes 44 by which the mounting bracket 40 is secured to the housing 14. The outlet end 46 of both sides 36, 38 of the mounting bracket 40 includes a curved spring assembly retaining portion 48, about which more will be said shortly.

Figure 5:
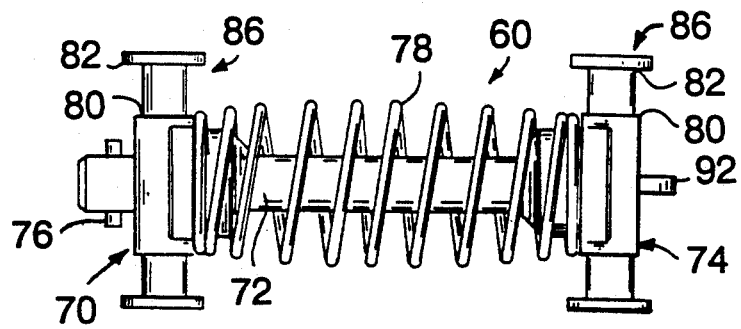
FIGS. 5 and 5A are top and side views respectively of the spring assembly of the check valve of FIG. 2.
Figure 5A:
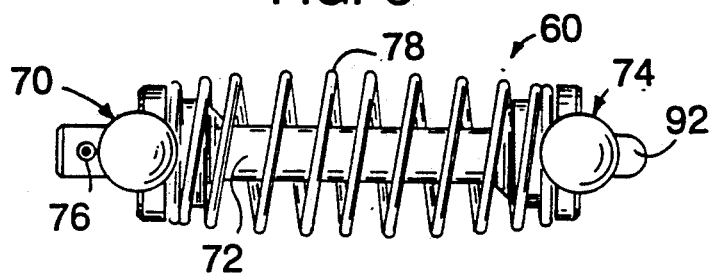

The sealing plug 20 is biased toward the closed position against the inlet 16 by action of spring assembly 60. Referring now also to FIGS. 5 and 5A, the spring assembly 60 includes a forward toggle member 74 fixedly attached at one end of a rod 72. A rear toggle member 70 is slidably mounted on the rod 72 and retained by a retaining pin 76. A compression spring 78 is disposed about the rod 72 and retained between the forward toggle member 74 and the rear toggle member 70. The spring 78 biases the rear toggle member 70 toward the retaining pin 76.

Toggle members 70, 74 are each generally cylindrical in shape and include a toggle extension 86 consisting of an inner retaining edge 80 and an outer retaining lip 82 at each end of the cylinder. The curved spring assembly retaining portion 48 of each side 36, 38 of the mounting bracket 40 engages between the inner retaining edge 80 and the outer retaining lip 82 of the corresponding side of the rear toggle member 70, thereby centering the rear toggle member 74 between the two curved spring assembly retaining portions 48.

The inlet end of the arm 22 has two sides 26, 28, each defining toggle retaining notches 90. The forward toggle member 74 engages each of the toggle retaining notches 90 between the inner retaining edge 80 and the outer retaining lip 82. A centering nipple 92 located on the forward toggle member 74 and along the axis of rod 72 rests against the outlet facing surface of the sealing plug 20.

The forward toggle member 74 working through the arm 22 and centering nipple 92 acts as the main point of contact between the sealing plug 20 and the spring assembly 60, as is shown in FIG. 3. When the sealing plug 20 is in closed position, the points of contact between the spring assembly 60 and the sealing plug 20 allow the spring 78 to bias the sealing plug 20 toward the closed position and provide resistance against a liquid pressure form the inlet 16. Referring to FIG. 4, when the liquid pressure is sufficient to overcome the resistance of the spring assembly 60, the sealing plug 20 is moved backwards and downwards, forcing the rod 72 to slide through the rear toggle assembly 70. The sealing plug 20 is prevented from further backwards or downwards movement by engagement of the forward toggle member 74 against the mounting bracket 40. In this position, liquid is allowed to flow relatively unimpeded from the inlet 16 toward the outlet 18.

When the liquid pressure falls below a predetermined level, the spring assembly 60 forces the sealing plug 20 upwards and forwards, as the sealing plug 20 assumes a closed position to seal the inlet 16. The closing of the inlet 16 prevents a back flow of liquid from occurring.

Referring to FIGS. 6, 6A, and 6B, the plots show pressure versus flow rate for different size toggle linkage check valves of the invention. The spring assembly 60 acts upon the sealing plug 20 and provides maximum resistance against the flow of liquid through the inlet 16 when the sealing plug 20 is in closed position (designated on the graph by the letter 'A'). A minimum resistance against the flow occurs when the sealing plug is in open position (designated on the graph by the letter 'B').

If repair or replacement of the toggle linkage check valve 10 is required, the spring assembly 60 is easily uncoupled from the sealing plug 20 and, if necessary, may be entirely uncoupled from the remaining portion of the toggle linkage check valve 10 as follows. First, the access cover 18 is removed, permitting access to the check valve 12 through the housing 14. Second, the forward toggle member 74 is forced backwards to compress the spring 78 and forced up and out of the toggle retaining notches 90, until the forward toggle assembly is uncoupled from the arm 22 (FIGS. 7 and 7a). Referring to FIGS. 5 and 5A, if the spring assembly 60 needs to be entirely uncoupled, the rear toggle member 70 is slid down and out from between the curved spring assembly retaining portions 48, after the forward toggle member 74 has already been uncoupled.

Referring now to FIG. 8, in another embodiment of the invention, the rear toggle extensions 86 are rotatably but not removably attached to the curved spring assembly retaining portions 100. The spring assembly can either be fixably attached to the curved spring assembly retaining portions 100 or to the toggle retaining notches, or removably and rotatably attached to both.

Referring to FIG. 9, another embodiment of the invention is a double check backflow preventer 108 which includes two modified toggle linkage check valve assemblies 102 and 104 within a cast iron housing 106. Housing 106 has an inlet 110 which accepts a 6 inch diameter inlet pipe (not shown) and an outlet 112 which accepts a 6 inch diameter outlet pipe (not shown). The overall length of backflow preventer 108, as measured along an axis 148 passing through both the center of inlet 110 and the center of outlet 112, is approximately 16 inches.

Referring now to FIGS. 9 and 10, check valve assembly 102 is a modular unit including a molded plastic (GE noryl GTX 830, or PPS ryton no. 1307 P-1) circular sealing plug 116, a molded plastic (GE noryl 731-701S) check valve cage 120, a molded plastic (GE GFN2 glass-filled noryl) check valve seat 122, and a telescoping spring assembly 134. Check valve cage 120 has two rails (only one of which is shown in the side views) interconnected by three cross members or ribs 109, 111, and 113, indicated in the figures by dotted lines. Telescoping spring assembly 134 is mounted in check valve assembly 102 such that an axis 150 passing through the center of spring assembly 134 is offset from an axis 148 that is perpendicular to the plane of sealing plug 116 when in a closed position. The angle of offset is approximately 15° (e.g., 13° to 17°), when measured with check valve assembly 102 in the closed position as shown in FIG. 9.

A cage pin 118 connects check valve seat 122, check valve cage 120, and sealing plug 116 together and defines an axis about which sealing plug 116 can pivot between a fully closed position (shown in FIG. 9) and a fully open position (shown in FIG. 10). In its fully closed position, sealing plug 116 prevents flow of liquid through check valve assembly 102. In its fully open position, sealing plug 116 is displaced to permit flow of liquid through check valve assembly 102.

Another stainless steel cage pin 124 connects check valve seat 122 to check valve cage 120 on the opposite side of check valve seat 122. Sealing plug 116 includes a molded plastic (nitrile compound no. 513HZ) annular ring 121 that is bonded to sealing plug 116. Annular ring 121 has an inner diameter of approximately 3.00 inches and an outer diameter of approximately 4.40 inches. When sealing plug 116 is in its fully closed position, annular ring 121 forms a tight seal with check valve seat 122.

Telescoping spring assembly 134 biases sealing plug 116 toward its closed position. Referring to FIG. 11, telescoping spring assembly 134, which is shown partially compressed, includes a stainless steel spring retainer 136 having two ears 147 and a tubular bore 137 with a lip 149 formed on one end which restricts the opening to bore 137. Spring assembly 134 also includes a stainless steel guide shaft 138 mounted in bore 137 so that it can move in and out of bore 137. One end guide shaft 138 has a nipple 139 formed on it and a leaded bronze shoulder stop 140, the other end has a leaded bronze bushing 142 securely mounted thereon (e.g., with a C-clip). A stainless steel coil spring 144 is disposed between shoulder stop 140 at one end and spring retainer 136 at the other end, at a location 14 formed between ears 147 and the wall of bore 137. Spring 144 urges spring assembly to full extension. Bushing 142 has a diameter small enough to allow it to slide freely within bore 137 but too large to fit through the opening to bore 137 defined by lip 149. Thus, bushing 142 prevents spring 144 from pulling guide shaft 138 completely out of bore 137.

As shown more clearly in FIG. 12, each rail of check valve cage 120 has a cradle 151 which defines pivot point 146. Cradle 151 receives ear 147 of spring retainer 136 and permits spring assembly 134 to pivot within a limited range about pivot point 146 (i.e., ear 147 pivots in cradle 151). On the frontside of sealing plug 116 there is a convex region 153. A socket 127 for receiving nipple 139 is formed in the backside of sealing plug 116 and aligned with convex region 153. The added material provided by convex region 153 permits socket 127 to be closer to the plane defined by annular ring 121 and thus contributes to a lower profile check valve assembly.

Spring assembly 134 is installed in check valve assembly 102 by compressing spring assembly 134 and inserting it into cage 120 so that ears 147 rest within cradles 151 and nipple 139 rests within socket 127. Once spring assembly 134 is inserted, it is released and it urges sealing plug 116 toward its fully closed position.

In check valve cage 120, rib 221 forms a ledge 16 which prevents sealing plug 116 from opening too far. When sealing plug 140 is fully open, shoulder stop 140 contacts ledge 161 and prevents it from opening any farther (as shown clearly in FIG. 10). In its fully open position, the plane of sealing plug 116 forms an angle of about 60° with the plane of the opening in valve seat 122. Also note that axis 150 of spring assembly 134 forms an angle of about 5° with a line interconnecting pivot point 146 with the axis of pin 118. If sealing plug 116 were allowed to open much farther than this amount, there is the possibility that it could lock open since too little of the spring force would then be in the proper direction to urge it to close.

As sealing plug 116 opens, spring 144 is compressed and guide shaft 138 is forced into bore 137 of spring retainer 136. At a certain point bushing 142 moves past pivot point 146. When fully open, guide shaft 138 extends through bore 137 such that bushing 142 partially extends out from one end of spring retainer 136.

Check valve seat 122, which defines an opening of about 4.00 inch diameter, has a V-groove 163 formed at one location around its outside perimeter and an annular channel 167 formed at another location around its outside perimeter. Annular channel 167 holds an O-ring 125. Check valve seat 122 fits into an opening in housing 106. Around the inside perimeter of that opening there is another V-groove 163 When check valve seat 122 is inserted into its opening in housing 106, O-ring 125 forms a seal between the outside perimeter of valve seat 122 and housing 106. In addition, V-groove 163 and V-groove 165 come into alignment with each other so as to form a channel. Check valve set 122 (and thus check valve assembly 102) is locked into position within housing 106 by inserting two retaining wires 126 (shown only in cross-section) made of stainless steel spring tempered round wire into the channel formed by the two aligned V-grooves. Each retaining wire 126 has a semi-circular shape and a finger-hook formed on one end to aid in inserting and removing the retaining wire. Access to the channels for the retaining wires 126 is obtained by removing a disc-shaped access cover 114 at the top of housing 106. Once cover 114 is removed, retaining wires 126 can be easily inserted into the channel formed by the aligned V-grooves 163 and 165. When inserted, each retaining wire extends about ½ the length of the channel which receives it.

Check valve assembly 104 (FIG. 9) is a modular unit similar in design and construction to that of check valve assembly 102. Check valve assembly 104 does, however, include a molded plastic (GE noryl no. 731-701S) check valve seat 128 having a different shape from check valve seat 122. Check valve seat 128 defines an opening to check valve assembly 104 that begins at a diameter of approximately 5.12 inches and tapers inwardly to a diameter of approximately 4 inches. The taper reduces resistance to flow and thus reduces the contribution of check valve assembly 104 to the total pressure drop through the backflow preventer. Check valve seat 128 also includes an integral horizontal cross member 133 (see FIG. 9). Cross member 133 aids in removing check valve assembly 104 from housing 106 by providing a structure which can be grasped by the person attempting to remove the valve (as described below).

Check valve seat 128, like check valve seat 122, includes a channel about its outside perimeter for holding an O-ring 131 that forms a seal between housing 106 and check valve seat 128 when seat 128 is assembled into housing 106. Unlike check valve seat 122, however, check valve seat 128 is held in position by a steel (C.R.S. 1018) retainer 130 which itself is maintained in position within housing 106 by two retaining wires 132 made of stainless steel spring tempered round wire. Retaining wires 132 which are inserted into a channel formed by two aligned V-grooves, one around the outside perimeter of check valve seat retainer 128 and the other formed in housing 106, lock retainer 130 (and thus check valve assembly 104) into housing 106.

Access cover 114, which includes a bleed hole into which a bleed screw 119 is threaded, is secured to housing 106 with six bolts 115 (only one of which is shown). An O-ring 117 in an annular ring that is machined into housing 106 around the opening at the top of housing 106 provides a seal between access cover 114 and housing 106.

Access to check valve assemblies 102 and 104 for repair or replacement is obtained by removing access cover 114 With access cover 114 removed, both check valve assemblies 102 and 104 may then be easily removed from housing 106 of backflow preventer 108. First, check valve assembly 102 is removed by withdrawing the two retaining wires 126 and then slipping check valve assembly 102 out of housing 106. Once check valve assembly 102 is out, retaining wires 132 are removed and check valve retainer 130 is taken out of housing 106. After retainer 130 has been removed, check valve assembly 104 may be slipped out of housing 106 by grabbing onto cross member 133 and pulling.

FIG. 13 presents a plot of the pressure drop (across backflow preventer 108) versus liquid flow rate (through backflow preventer 108) for a 4" valve. This is to be compared with FIGS. 6–6B which show plots of the performance of the first described toggle link design. Notice that the flow curve for the improved toggle linkage mechanism does not contain the abrupt decrease in pressure drop vs. flow rate that characterizes the first valve design. Rather the performance curve for the improved toggle link valve exhibits gradual changes in pressure drop as a function of flow rate. This indicates that the sealing cover experiences less shock during operation than the earlier design. Also, note that the point marked 'A' on the plot of FIG. 13 is the point at which backflow preventer 108 provides maximum resistance against the flow of liquid and the point marked 'B' indicates the point at which backflow preventer 10 provides minimum resistance against the flow (i.e., when check valve assemblies 102 and 104 are both fully open). Because of the offset of spring assembly 134, maximum resistance to flow occurs only after the valve has begun to open.

(Note that the specification of specific materials for the various components described above is not meant to imply that those parts could not be made out of other acceptable materials.)

The foregoing description has been limited to a specific embodiment of this invention. It will be apparent, however, that variations and modifications may be made to the invention with the attainment of some or all of the advantages of the invention. Therefore, it is the object of the appended claims to cover all such variations of the modifications as come within the true spirit and scope of the invention.

What is claimed is:

1. A toggle linkage check valve comprising:
   a housing having an inlet and an outlet;
   a valve assembly disposed within said housing and including
   a sealing plug adapted for movement between a first, closed position for preventing flow of liquid between said inlet and said outlet, and a second, open position for substantially permitting flow of liquid between said inlet and said outlet, and
   a spring assembly removably disposed within said valve assembly, said spring assembly contacting said sealing plug and biasing said sealing plug towards said first, closed position, said spring assembly comprising a rod member and means for biasing said rod member toward said sealing plug,
   in said second, open position of said sealing plug, said rod member lying at an acute angle to a plane of said sealing plug.

2. The toggle linkage check valve of claim wherein in said first, closed position of said sealing plug, said rod member lies at an acute angle with respect to the perpendicular to a plane of said sealing plug.

3. The toggle linkage check valve of claim 2 wherein said acute angle with respect to the perpendicular to the plane of said sealing plug is approximately 15°.

4. The toggle linkage check valve of claim 1 wherein said spring assembly is a telescoping spring assembly.

5. The toggle linkage check valve of claim 1 wherein said means for biasing is a coil spring.

6. The toggle linkage check valve of claim 1 wherein said valve assembly further includes a valve seat, said sealing plug contacting said valve seat when said sealing plug is in said first, closed position.

7. The toggle linkage check valve of claim 6 wherein said valve assembly is a modular unit comprising said sealing plug, said spring assembly, and said valve seat.

8. A backflow preventer valve comprising:
   a housing having an inlet and an outlet;
   a first valve assembly disposed within said housing and including
   a first sealing plug adapted for movement between a first, closed position for preventing flow of liquid between said inlet and said outlet, and a second, open position for substantially permitting flow of liquid between said inlet and said outlet, and
   a first spring assembly removably disposed within said first valve assembly, said first spring assembly contacting said first sealing plug and biasing said first sealing plug towards said first, closed position, said first spring assembly comprising a first rod member and first means for biasing said first rod member toward said first sealing plug, and
   a second valve assembly disposed between said first valve assembly and said outlet, said second valve assembly including
   a second sealing plug adapted for movement between a first, closed position for preventing flow of liquid between said inlet and said outlet, and a second, open position for substantially permitting flow of liquid between said inlet and said outlet, and
   a second spring assembly removably disposed within said second valve assembly, said second spring assembly contacting said second sealing plug and biasing said second sealing plug towards said first, closed position, said second spring assembly comprising a second rod member and second means for biasing said second rod member toward said second sealing plug,
   in said second, open position of said first sealing plug, said first rod member lies at a first acute angle to a plane of said first sealing plug, and
   in said second, open position of said second sealing plug, said second rod member lies at a second acute angle to a plane of said second sealing plug.

9. The preventer shutoff valve of claim 8 wherein in said first, closed position of said first sealing plug, said first rod member lies at an acute angle with respect to the perpendicular to a plane of said first sealing plug.

10. The preventer shutoff valve of claim 9 wherein said acute angle at which said first rod member lies with respect to the perpendicular to the plane of said first sealing plug is approximately 15°.

11. The preventer shutoff valve of claim 8 wherein said first spring assembly is a first telescoping spring assembly.

12. The preventer shutoff valve of claim 8 wherein said first means for biasing is a first coil spring.

13. The preventer shutoff valve of claim 8 wherein said first valve assembly further includes a first valve seat, said first sealing plug contacting said first valve seat when said first sealing plug is in said first, closed position.

14. The preventer shutoff valve of claim 13 wherein said first valve assembly is a first modular unit comprising said first sealing plug, said first spring assembly, and said first valve seat.

15. The preventer shutoff valve of claim 8 wherein in said first, closed position of said second sealing plug, said second rod member lies at an acute angle with respect to the perpendicular to a plane of said second sealing plug.

16. The preventer shutoff valve of claim 15 wherein said acute angle at which said second rod member lies with respect to the perpendicular to the plane of said second sealing plug is approximately 15°.

17. The preventer shutoff valve of claim 8 wherein said second spring assembly is a second telescoping spring assembly.

18. The preventer shutoff valve of claim 8 wherein said second means for biasing is a second coil spring.

19. The preventer shutoff valve of claim 8 wherein said second valve assembly further includes a second valve seat, said second sealing plug contacting said second valve seat when said second sealing plug is in said first, closed position.

20. The preventer shutoff valve of claim 19 wherein said second valve assembly is a second modular unit comprising said second sealing plug, said second spring assembly, and said second valve seat.

* * * * *

UNITED STATES PATENT AND TRADEMARK OFFICE
CERTIFICATE OF CORRECTION

Page 1 of 2

PATENT NO. : 5,236,009

DATED : August 17, 1993

INVENTOR(S) : Rand H. Ackroyd

It is certified that error appears in the above-identified patent and that said Letters Patent is hereby corrected as shown below:

Column 1, line 18, after "pressure" insert -- . --;

Column 2, line 6, delete "15"" and insert therefor -- 15° --;

Column 2, line 8, after "spring" insert -- . --;

Column 2, line 65, delete "(Note with a unit that weighs only 250 pounds.";

Column 5, line 11, delete "form" and insert therefor -- from --;

Column 6, line 52, delete "14" and insert therefor -- 141 --;

Column 7, line 10, delete "221" and insert therefor -- 111 --;

Column 7, line 10, delete "16" and insert therefor -- 161 --;

Column 7, line 37, after "163" insert -- . --;

UNITED STATES PATENT AND TRADEMARK OFFICE
CERTIFICATE OF CORRECTION

PATENT NO. : 5,236,009

DATED : August 17, 1993

INVENTOR(S) : Rand H. Ackroyd

It is certified that error appears in the above-identified patent and that said Letters Patent is hereby corrected as shown below:

Column 8, line 30, after "114" (first occurrence) insert -- . --; and

Column 8, line 57, delete "10" and insert therefor -- 108 --.

Claim 2, column 9, line 26, after "claim" insert -- 1 --.

Signed and Sealed this

Seventh Day of June, 1994

Attest:

BRUCE LEHMAN

Attesting Officer

Commissioner of Patents and Trademarks